United States Patent
Arini et al.

(10) Patent No.: US 9,301,019 B1
(45) Date of Patent: Mar. 29, 2016

(54) MEDIA CORRELATION BY FEATURE MATCHING

(71) Applicants: Nick Salvatore Arini, Southampton (GB); Owen Arthur Charlebois, Columbia, MA (US); Elissa Lee Chennavasin, Santa Clara, CA (US)

(72) Inventors: Nick Salvatore Arini, Southampton (GB); Owen Arthur Charlebois, Columbia, MA (US); Elissa Lee Chennavasin, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/844,289

(22) Filed: Mar. 15, 2013

(51) Int. Cl.
*H04N 7/16* (2011.01)
*H04H 60/33* (2008.01)
*H04N 21/637* (2011.01)

(52) U.S. Cl.
CPC .................................. *H04N 21/637* (2013.01)

(58) Field of Classification Search
CPC ........................ H04N 21/637; H04N 21/44222
USPC ........................................................ 725/9–21
See application file for complete search history.

(56) References Cited

U.S. PATENT DOCUMENTS

| | | | |
|---|---|---|---|
| 6,405,370 | B1 | 6/2002 | Jarrell |
| 2005/0216509 | A1* | 9/2005 | Kolessar et al. ........... 707/104.1 |
| 2008/0148309 | A1* | 6/2008 | Wilcox et al. ................... 725/14 |
| 2011/0093878 | A1 | 4/2011 | Falcon |
| 2012/0029670 | A1 | 2/2012 | Mont-Reynaud |

FOREIGN PATENT DOCUMENTS

WO   WO-2010049745 A1   5/2010

* cited by examiner

*Primary Examiner* — Yassin Alata
(74) *Attorney, Agent, or Firm* — Foley & Lardner LLP; John D. Lanza

(57) ABSTRACT

A media correlation method, executed by a processor, determines an identity of a program. The method includes detecting a sign-in by a first media device; determining a location of the first media device relative to a second media device; receiving from the first media device, content clips emanating from the second media device; and identifying a program displayed on the second media device based on the received content clips.

17 Claims, 9 Drawing Sheets

MEDIA CORRELATION BY FEATURE MATCHING

BACKGROUND

Program providers supply content segments to viewers over various communications networks. Content segments may include broadcast television programs. Content segments may include video programs streamed, for example, over the Internet. Content segments also may include video advertisements that accompany, or in some way relate to the video programs. Content segments may be accessed using an application on a mobile device. Other content segments and other distribution methods are possible.

Sponsors provide sponsored content segments to promote products and services. Sponsors may use one or more different media (e.g., television, radio, print, online) to promote the products and services. Sponsors may create a promotional campaign that uses sponsored content segments appearing in different media. The sponsored content segments may be for the same products and services although the sponsored content segments appear in different media. Thus, individuals may be exposed to sponsored content segments in a first media, a second media, and so on.

Program providers may be interested in knowing what content segments are accessed or viewed by which viewers. Sponsors may want to know how effective their promotional campaign is. One way to determine this "viewing history" is by sampling a large population and making inferences about the viewing history based on the sample results.

SUMMARY

A media correlation method, executed by a processor, determines an identity of a program. The method includes detecting a sign-in by a first media device; determining a location of the first media device relative to a second media device; receiving from the first media device, content clips emanating from the second media device; and identifying a program displayed on the second media device based on the received content clips.

DESCRIPTION OF THE DRAWINGS

The detailed description refers to the following Figures in which like numerals refer to like items, and in which.

DETAILED DESCRIPTION

Figure 1:
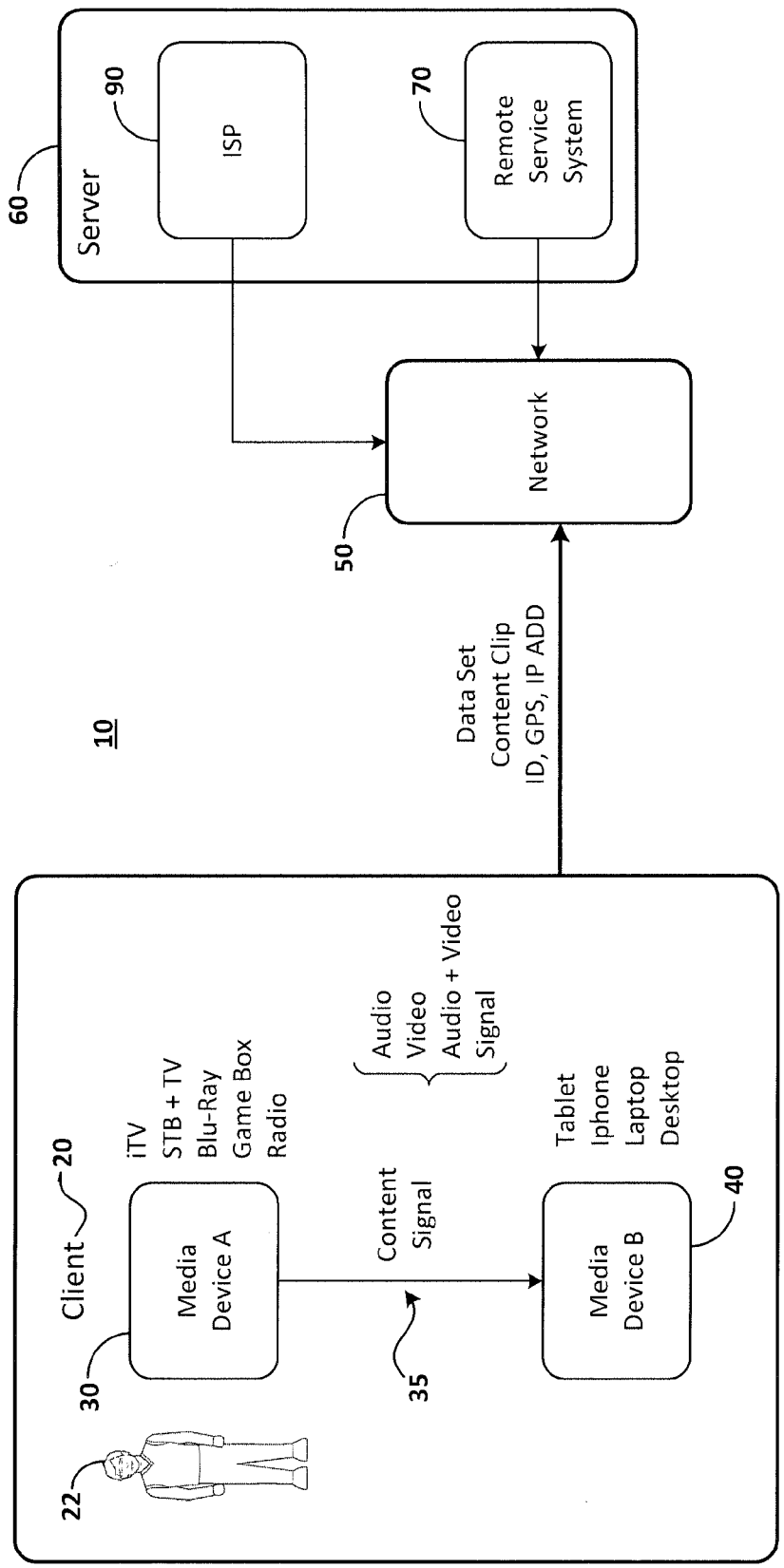
FIGS. 1-4 illustrate examples of environments in which media correlation through audio matching is enabled.

Program providers and content sponsors may be interested in how widely consumed their programs and sponsored content are. For example, what is the viewing history of a television program; what is the reach of an accompanying advertisement? One way to determine this "consumption information" is by sampling a large population and making inferences about the viewing history based on the sample results. One way to sample a viewing population is through the use of individual panelists (viewers in the sample population) and metering devices that record and report on the individual panelists' viewing history. For example, an individual panelist (i.e., a viewer) may agree to installation of a meter at the panelist's residence. The meter records the individual panelist's television viewing and Internet activity, and reports the data to a remote server. Note that this approach works in a household having more than one viewer. For example, each household member may be recruited as a panelist. Alternately, a subset of the household members may participate as panelists.

In contrast to metering individual panelists, viewing history data may be collected by a single metering device installed at a household. For example, a television set top box (STB) may record television viewing data. While television set top box (STB) data offers rich audience data at a granularity and at a scale that has not been previously available, STB data has been inherently limited to a machine or device level or (through account information collected by the operator) household level measurement. Television ratings services typically use a small, less granular sample size, but offer both household and individual level television audience estimates (for example, television ratings for men age 18-34. These ratings traditionally are collected by having panelists log in and out on a remote handset. While allowing individual attribution, logging in and out of television viewing has known panelist compliance issues such as missing log ins and forgotten log outs. Because STB-based television ratings do not include individual-level audience estimates, market acceptance and adoption of STB television ratings is limited.

Some systems have attempted to address this problem by combining individual demographics data with the STB data. However, the viewing estimates remain at a household or device level. In addition, current systems are limited because:

not all households have STBs with a return path to report viewing history;
not all televisions sets in a household have a STB;
STBs can be left on with the attached television turned off, which may result in false positives;
multiple televisions may be active with fewer viewers than televisions, which also leads to false positives;
demographic data may be missing or inaccurate.

To overcome these and other limitations with current systems that STB log data, disclosed herein are systems and methods that collect and use data collected from a second device to identify a program. The methods implemented on the systems include installing downloadable audio match software or media correlation programs to a viewer's mobile device, such as a smartphone. Although not all television viewers have a mobile media device such as a smartphone, the population of such viewers is large enough for statistical analysis; in addition, the population of smartphone users is increasing. In an alternative, to be recruited as a panelist, an individual may be supplied with, or required to acquire a smartphone. Panel management software then may create a logical link (panelist ID to household/account ID to STB receiver ID) between individual entities. The systems and methods may be implemented in different aspects. In a first aspect, a panelist or viewer is asked by the system to log in and log out if the panelist is watching television. This aspect may be suited for a shared device scenario, such as a tablet used in a living room with multiple television viewers from the household.

In a second aspect, the systems operate under a simplifying assumption that a mobile device is a personal device and that all "detections" of television viewing from that mobile device are therefore to be attributed automatically to media device owner. In this aspect, the systems may operate to establish individual ownership and user of shared media devices.

In a third aspect, the panelist's smartphone may execute a media correlation process, detect an audio signal from a first media device, and pass a detection signal to a remote service. The remote service may then send a message (e.g., a text message) asking the panelist to log on for purposes of media correlation processing.

To support operation of the media correlation systems, the mobile media devices may include audio detection applications (e.g., hardware, firmware, software, or any combination thereof) to detect, measure and record sounds from the television programs being viewed. While some audio matching systems currently exist, they are limited because their response time is on the order of several seconds and match rates depend on the quality of the audio signal and ambient noise conditions. In addition, these current systems only may give information on currently tuned channel.

Once installed or in place at a viewing location, these two metering systems may yield two data streams, one coming from the STB and one coming from the mobile devices of the individual viewer's in the household. Alternately, the data streams may be combined. The herein disclosed systems and methods may use a process to determine if the smartphone-based television audio detections occur while the viewer is at home or not at home. For example, the systems may use GPS tracking, cell tower proximity, or other location processes.

Where there is an overlap (a TV STB reports tuning to a channel and one or more mobile devices detect a same channel (content) through audio matching then timestamps may be compared and synced (they may not be exactly the same) and the viewing of that channel may be attributed to that individual until either a channel change is detected on the STB or a channel change is detected on the mobile device or the mobile device detects a different channel or no match at all. Where there is tuning on the STB and no signal on any mobile device, then (assuming all viewers in the household have a smartphone meter installed and are registered), then no viewing may be attributed. Where there is a detection on the mobile device and none on the STB, then the viewing will be attributed to "other" which could be a non-metered television (no STB or an STB with no metering), out of home viewing, or viewing on a non-television device.

Thus, the herein disclosed systems may use a process for automatic, audio-based content recognition of television programs displayed on a first media device by collecting feature data such as audio samples on a second media device. As noted above, the second media device may be a smartphone. The thus collected feature data (e.g., audio samples) may be temporarily stored on the smartphone and then may be transferred to an external server. The audio samples may be digitized and compressed. Later, the smartphone may transfer the audio samples or audio features to a remote server at a recognition facility, where the audio samples are identified.

In an embodiment, an audio matching meter (e.g., software or firmware) installed on a smartphone includes an audio reception module to acquire the audio signal and an analog to digital converter that includes necessary signal conditioning such as pre-amplifiers and anti-aliasing filters. The output of the analog to digital converter may be a digital time series representing the voltage waveform of the captured audio signal. The digital signal processor then may format and label the captured audio block for storage in a non-volatile memory such as flash memory. Alternatively, the digital signal processor may perform feature extraction and store only the highly compressed recognition features in flash memory.

To accomplish the audio identification, the audio samples or audio feature samples may be transferred to an external site, using the Internet, for example. The components of the remote site, which are used to perform audio signal identification, may include a Web site host, a pattern recognition subsystem, a pattern initialization system for generating reference patterns from recordings, and the necessary databases. Viewers communicate with the Web site and transmit their audio samples for identification. These samples are processed in the pattern recognition subsystem, which compares the features of the viewer-supplied audio samples with similar feature data stored in a pattern database.

A pattern initialization subsystem accepts complete audio works that are to be entered into the pattern database. These subsystems perform feature extraction in the same manner as in the audio sample capture processing. However, instead of constructing brief packets of features for identification, the initialization subsystems extract continuous feature waveforms from the entire work. The feature waveforms are then broken into overlapping time-series segments and processed to determine which features should be used for signal recognition and in what order. The resulting reference pattern data structures (i.e., the fingerprints) are stored in the pattern database. These fingerprints subsequently are transferred to the pattern recognition subsystem for comparison with unknown input feature packets.

When audio samples from the user are matched with fingerprints in the pattern database, the detection results are indexed with corresponding data in a management database such as an identification of the television program.

The disclosure that follows describes feature extraction and recognition as relates to audio samples. However, the herein disclosed systems and methods may apply to other features of a program, including video features.

FIGS. 1-4 illustrate example environments in which an identify of a media program displayed on a first media device may be determined based on information collected on a second media device. In the example environments, one media device may be a fixed location television installed at the viewer's home, and another media device may be a mobile media device. More particularly, the mobile media device may be a "personal" media device such as a smartphone, for example.

In FIG. 1, environment 10 includes client 20 coupled to server 60 by network 50. The network 50 may be any communications network that allows the transmission of signals, media, messages, voice, and data among the entities shown in FIG. 1, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless. The network 50 may be all or a portion of an enterprise or secured network. In an example, the network 50 may be a virtual private network (VPN) between the Internet service provider 90 and the client 20. While illustrated as a single or continuous network, the network 50 may be divided logically into various sub-nets or virtual networks, so long as at least a portion of the network 50 may facilitate communications among the entities of FIG. 1.

The server 60 includes remote service system 70, which provides media, including advertisements, and other services, to the client 20. The advertisements include media-service advertisements that are intended for consumption by viewer 22 at one of the media devices 30 or 40. The remote service system 70 will be described in more detail later, with respect to FIGS. 2 and 5B. The server 60 also includes a service provider, which in the illustrated embodiment of FIG. 1, is Internet service provider 90.

The client 20 includes media device 30 (device A) and media device 40 (device B), operated by viewer 22. In an aspect, the viewer 22 is a panelist, specifically recruited to provide media consumption information to the remote service system 70.

In one alternative of the embodiment of FIG. 1, media device 30 is generally fixed in position in the environment 10, and media device 40 is a mobile media device. The media devices 30 and 40 are capable of some communication, either one or two-way, using communications path 35. The communications path 35 may be wired or wireless, or both wired and wireless. Wireless mechanisms include infra-red, WiFi, and "broadcast." The media device 30 may be an Internet connected "smart" television (iTV), a "basic" or "smart" television connected to a set top box (STB), a Blu-Ray™ player, a game box, and a radio, for example. The media device 40 may be a tablet, a smartphone, a laptop computer, or a desk top computer, for example.

Among other functions, the media device 40 acquires data from the media device 30 that may be used to identify the specific media displayed (e.g., visually and/or audibly) on the media device 30. For example, the media device 40 may record content in the form of audio emanating from the media device 30. In an alternative, the media device also may capture video or both video and audio signals from the media device 30.

When the media device 40 is turned on, an individual panelist 22 using the media device 40 may sign on with the Internet service provider 90. The media device 40 then may send the recorded audio content, as audio content clips, for example, to the server 60. The media device 40 may send the audio content clips in real time or near real time, or may store the audio content clips for delayed delivery. Alternately, the media device 40 may perform some analysis and processing of the audio content clips to generate data sets, and send the data sets to the server 60. A data set may identify the media being displayed on the media device 30. In addition to the content clips and/or data sets, the media device 40 also may send other data, such as the location, based, for example on IP address, of the media device 40 and/or the media device 30 to the server 60. Finally, the media device 40 may send identification (ID) information to the server 60 that identifies the media devices and/or the panelist 22 at the client 20. The identification information may be provided when the panelist logs onto, or registers with, the ISP 90 or another service, such as a service that provides at least some of the media being displayed on the media devices 30 and 40.

Whether performed locally or remotely, automatic content recognition, in an embodiment, uses fingerprinting to determine what programming is displayed. Such fingerprinting uses, in one alternative, a reference data base of prerecorded audio clips from the programs for comparison to the audio content clips recorded by the media device 40. Alternatively, for remote content identification, a separate processor may monitor programs being displayed (perhaps with a slight time delay) and compare the just-received content clips to the monitored programming. This automatic content recognition process involves translating (e.g., analog/digital conversion) the observed/recorded audio content clips and encoding the digitized representations as fingerprints representing an audio signal. Audio content recognition, for example, begins by reformatting (digitizing) the audio input, framing the digitized signal, extracting features, and creating signatures from the extracted features. The thus-created signatures constitute the audio fingerprint. Fingerprinting algorithms then can identify a program in real time or near real time based on the signatures.

Figure 2:
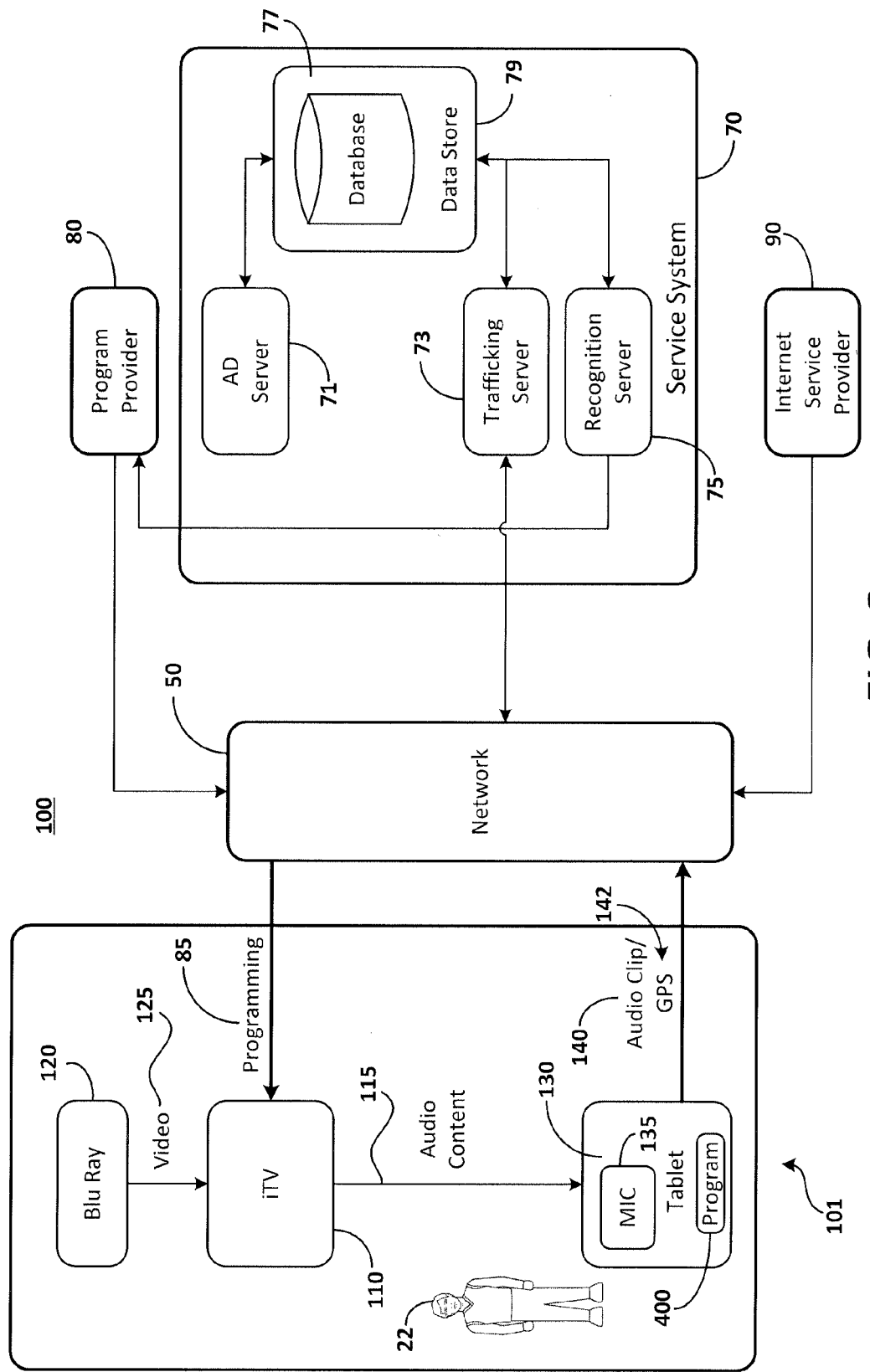

FIG. 2 illustrates an embodiment of an alternate environment that enables media program identification. In FIG. 2, environment 100 includes, at viewing location 101, iTV 110, Blu-Ray™ device 120, and tablet 130. The iTV 110 receives programming 85 from program provider 80 over network 50. The programming 85 includes broadcast and streaming television programs and advertisements, games, video clips, data, email, and other media. The Blu-Ray™ device 120 provides video media 125 (e.g., recorded movies) for display on the iTV 110. The tablet 130 is operating and viewer 22 is logged onto email/Internet service provider 90. The tablet 130 receives programming 85 over the network 50 and accesses, using microphone 135, audio content 115 from the iTV 110. The tablet 130 creates audio clips from the audio content 115 and provides the audio clips 140, along with location 142 of the tablet 130, to the service system 70. The tablet includes media correlation program 400, described with respect to FIG. 6A.

The service system 70 is coupled to the program provider 80 and to the tablet 130 through network 50. Optionally, the service system 70 is coupled to Internet service provider 90. The service system 70 includes ad server 71, trafficking server 73, recognition server 75, and database 77.

The ad server 71 is used by an advertiser to request TV-Schedule advertisements, and other advertisements, and to send such advertisements for distribution to media devices such as the iTV 110 and the tablet 130. The advertisements may be sent to the program provider 80 for incorporation into the programming, or may be sent separately from the programming. The advertiser selects advertisements to schedule, uploads the advertisements, and sets criteria for display of the advertisements.

The trafficking server 73 provides advertisements to the ad server 71 for distribution to the iTV 110 and the tablet 130. The trafficking server 73 connects to a number of databases (represented by database 77) such as TV guide, ad scheduling, and/or demographic databases, to determine which advertisements are available for distribution. The trafficking server 73 stores the selected advertisements, along with the creatives and criteria for serving a specific advertisement, in the database 77.

The recognition server 75 receives the audio clips from the tablet 130 and compares the clips to a file of existing audio data to identify the media displayed on the iTV 110 that is associated with the audio clip. The database 77 also includes data for automatic content recognition of collected media clips, and data for selecting targeted advertisements.

Figure 3:
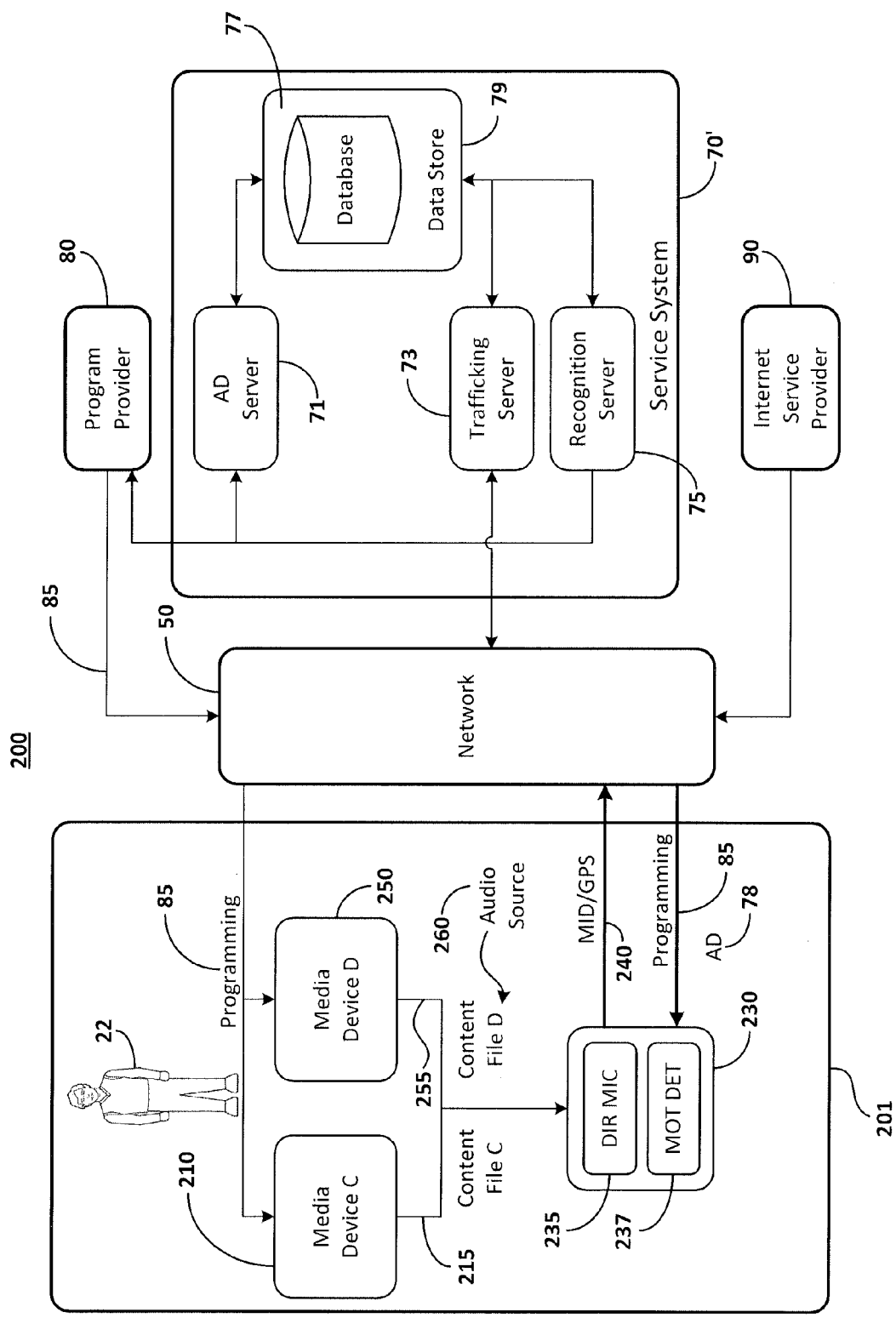

FIG. 3 illustrates an embodiment of an environment in which media program identification may be enabled. In FIG. 3, environment 200 includes media devices at viewing location 201, network 50, program provider 85, Internet service provider 90, and service system 70'.

In the environment 200, the service system 70' functions in most respects to the service system 70 of FIG. 2 except that the recognition server 75 does not necessarily perform the audio clip recognition function. Instead, as described below, these functions are provided in tablet 230.

Viewing location 201 includes media device C 210 and media device D 250. The media devices C and D may be similar devices. For example, the media devices C and D may be iTV's. Both devices C and D are displaying media, but are tuned to different channels, and as such the displayed media are different.

The viewing location 201 further includes tablet 230. The tablet 230 includes directional microphone 235 and motion detector 237. In an embodiment, the motion detector is an accelerometer. In another embodiment, the motion detector is a motion sensor associated with a built-in camera. When coupled with appropriate software, the motion detector 237 senses motion of the tablet, which may indicate that the tablet 230 is hand held. This determination of being hand held can be used when determining viewer presence.

The directional microphone 235 allows the tablet 230 to distinguish audio files from the media devices C and D. Thus, the tablet 230 can relate a specific audio file to a specific media device. Alternately, or in addition, the directional microphone 235 can be used to filter out audio from sources, such as audio source 260, other than the media devices C and D. Thus, the tablet 130 may be able to filter out conversations occurring at the viewing location 201.

Figure 4:
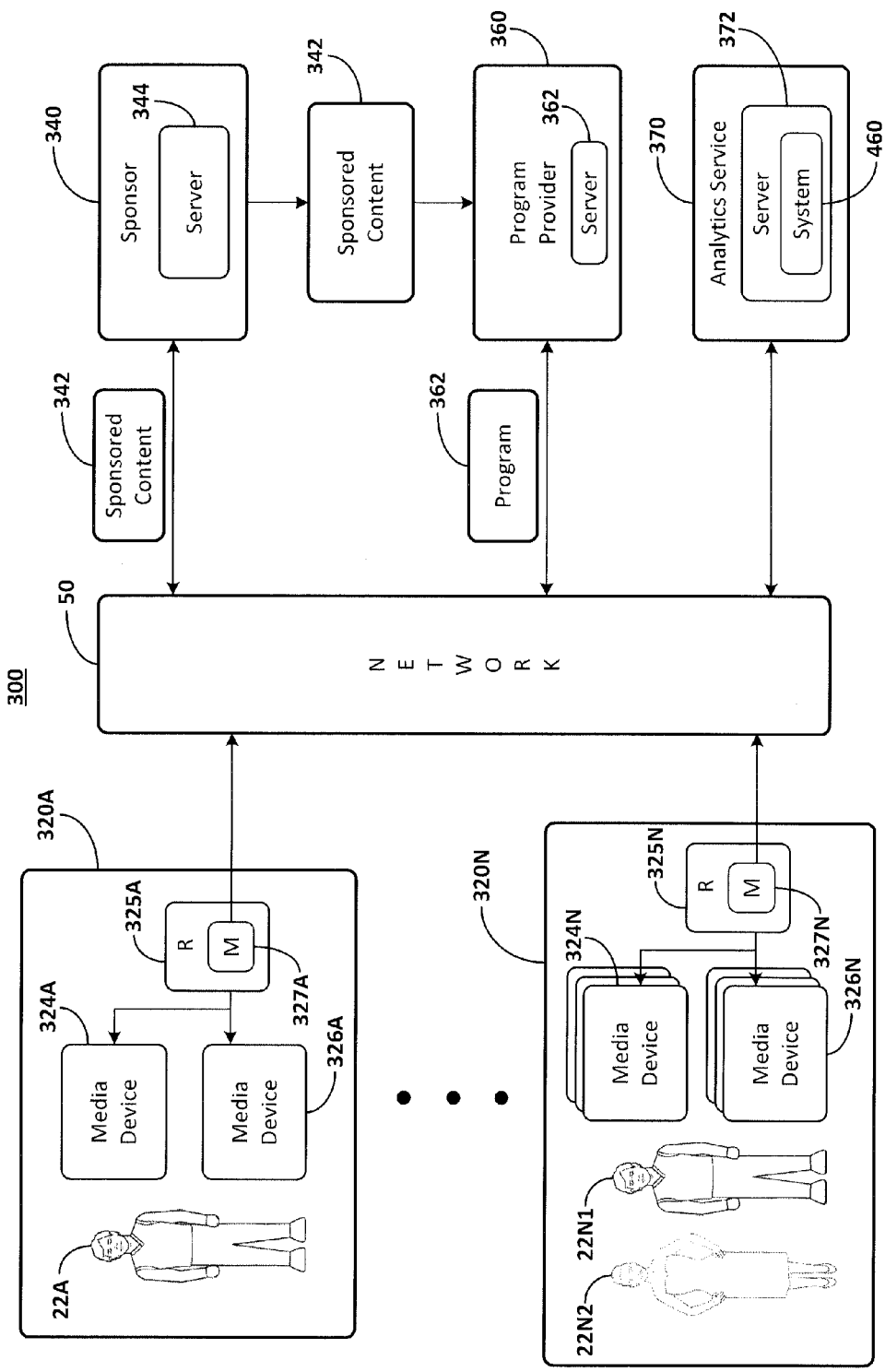

FIG. 4 illustrates yet another environment in which a media program may be identified. In FIG. 4, environment 300 includes viewing locations 320i, sponsor 340, program provider 360 and analytics service 370, all of which communicate using communications network 50. Although FIG. 4 shows these entities as separate and apart, at least some of the entities may be combined or related. For example, the sponsor 340 and analytics service 370 may be part of a single entity. Other combinations of entities are possible.

The viewing locations 320i include first media devices 324i and second media devices 326i through which viewers (e.g., panelists) 22i are exposed to media from sponsor 340 and program provider 360. A viewing location 320i may be the residence of a panelist 22i who operates media devices 324i and 326i to access, through router 325i, resources such as Web sites and to receive television programs, radio programs, and other media. The media devices 324i and 326i may be fixed or mobile. For example, media device 324i may be an Internet connected "smart" television (ITV); a "basic" or "smart" television connected to a set top box (STB) or other Internet-enabled device; a Blu-Ray™ player; a game box; and a radio, for example. Media device 26i may be a tablet, a smart phone, a laptop computer, or a desk top computer, for example. The media devices 324i and 326i may include browsers. A browser may be a software application for retrieving, presenting, and traversing resources such as at the Web sites. The browser may record certain data related to the Web site visits. The media devices 324i and 326i also may include applications. The panelist 22i may cause the media devices 324i or 326i to execute an application, such as a mobile banking application, to access online banking services. The application may involve use of a browser or other means, including cellular means, to connect to the online banking services.

The viewing location 320A may be a single panelist viewing location and may include a meter 327A that records and reports data collected during exposure of sponsored content segments 342 and programs 362 to the panelist 22A. The example meter 327A may be incorporated into the router 325A through which all media received at the viewing location 320i passes.

Alternately, in an example of a two-viewer viewing locations, panelists 22N1 and 22N2 operate media devices 324N and 326N. In operating these media devices, the panelists 22Ni may operate separate meters 327N1 and 327N2 for each media device. The meters 327N1 and 327N2 may send the collected data to the analytics service 370.

The sponsor 340 operates server 344 to provide sponsored content segments that are served with programs 362 provided by the program provider 360. For example, the server 344 may provide sponsored content segments to serve with broadcast television programming. The sponsored content segments 342 may include audio, video, and animation features. The sponsored content segments 342 may be in a rich media format. The sponsor 340 may provide a promotional campaign that includes sponsored content segments to be served across different media types or a single media type. The cross-media sponsored content segments 342 may be complementary; that is, related to the same product or service.

The program provider 360 delivers programs for consumption by the panelists 22i and also for consumption by members of a large population from which the panelists 22i are recruited. The programs 362 may be broadcast television programs. Alternately, the programs 362 may be radio programs, Internet Web sites, or any other media. The programs 362 include provisions for serving and displaying sponsored content segments 342. The program provider 60 may receive the sponsored content segments 342 from the sponsor and incorporate the sponsored content segments into the programs 362. Alternately, the panelist's media devices may request a sponsored content segment 342 when those media devices display a program 362.

The analytics service 370, which operates analytics server 372, may collect data related to sponsored content segments 342 and programs 362 to which an panelist was exposed. In an embodiment, such data collection is performed through a panelist program where panelists 22 are recruited to voluntarily provide such data. The actual data collection may be performed by way of surveys and/or by collection by the meters 327. The collected data are sent to and stored in analytics server 372. The service 370 processes the data according to program 400, stores the results of the processing, and may report the results to another entity such as the sponsor 340.

In executing the processes enabled in the environments of FIGS. 1-4, and as otherwise disclosed herein, individual viewer and household demographic and television viewing data may be collected and used. In situations in which the systems disclosed herein may collect and/or use personal information about panelists or other viewers (collectively, viewers), or may make use of personal information, the viewers may be provided with an opportunity to control whether programs or features collect viewer information (e.g., information about a viewer's social network, social actions or activities, profession, a viewer's preferences, or a viewer's current location), or to control whether and/or how to receive media, including advertisements, from an server that may be more relevant or of interest to the viewer. In addition, certain data may be treated in one or more ways before it is stored or used, so that personally identifiable information is removed. For example, a viewer's identity may be treated so that no personally identifiable information can be determined for the viewer, or a viewer's geographic location may be generalized where location information is obtained (such as to a city, ZIP code, or state level), so that a particular location of a viewer cannot be determined. Thus, the viewer may have control over how information is collected about the panelist and used by a server.

Figure 5:
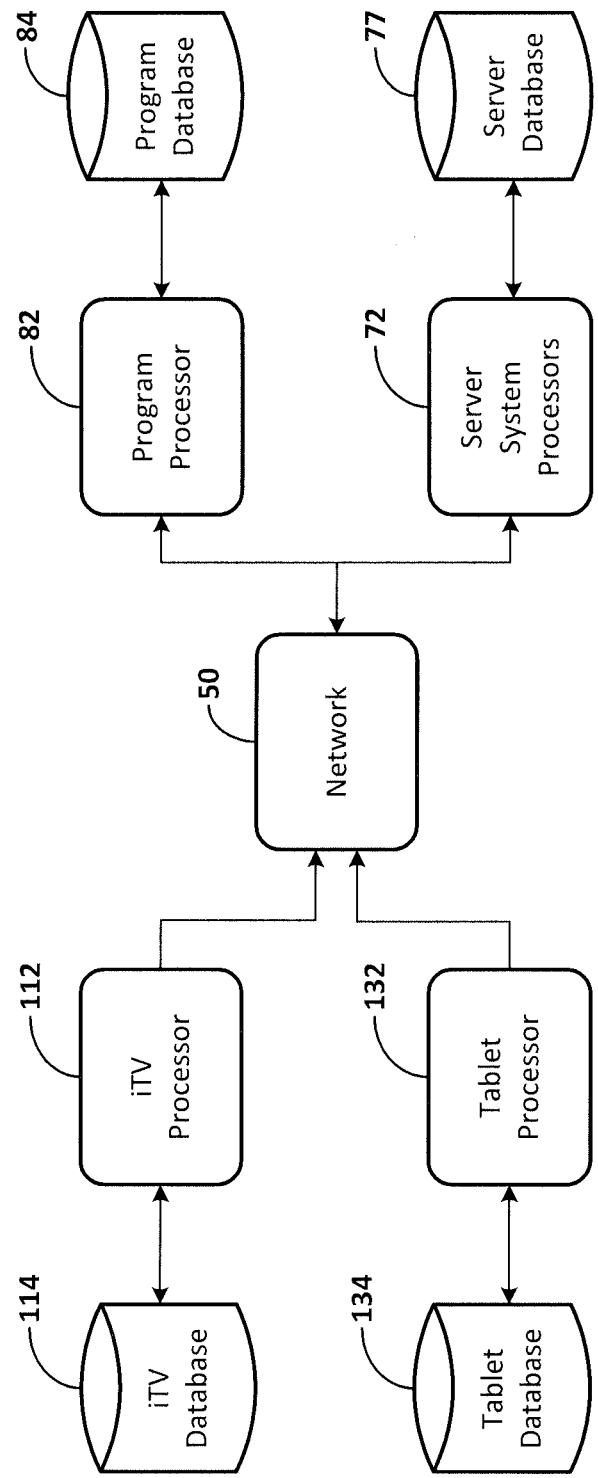
FIG. 5 illustrates an embodiment of select computing system elements for the components of FIG. 2.

FIG. 5 illustrates an embodiment of select computing system elements for the components of FIG. 2. Similar elements would exist for the components of FIGS. 1, 3, and 4. In FIG. 5, the iTV 110 includes iTV processor 112 and iTV database 114; tablet 130 includes tablet processor 132 and tablet database 134; program processor 80 includes processor 82 and program database 84, and service system 70 includes one or more processors 72 and server database 77. In addition to storing data, programming, metadata, and information related to targeting TV-schedule advertisements to the tablet 130, the databases shown in FIG. 5 also store programs comprising computer code that when executed by their associated processors, enable delivery of TV-schedule advertisements, and other (default) advertisements to the tablet 130 based on content displayed on a separate, independent device, namely iTV 110.

Figure 6A:
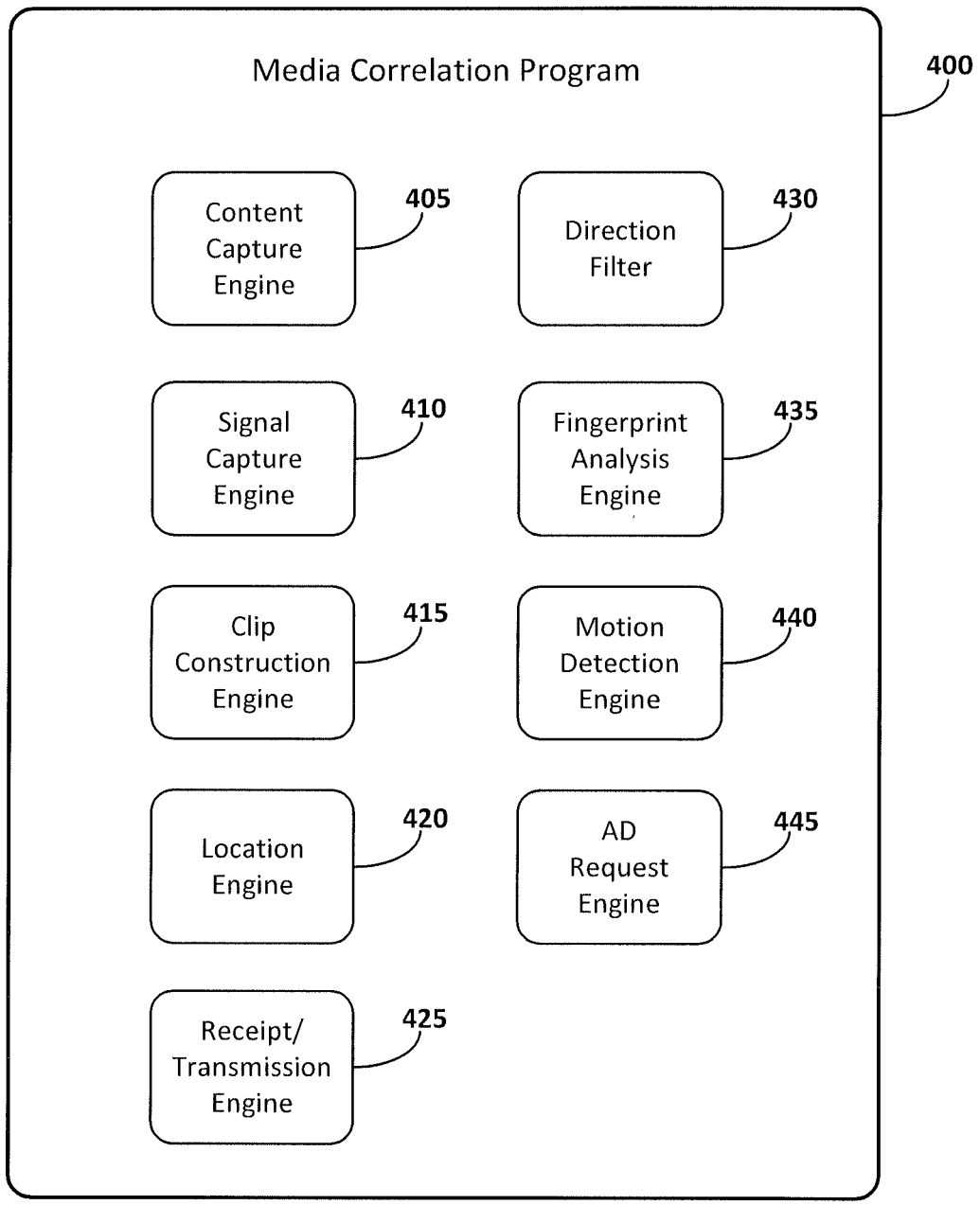
FIGS. 6A and 6B illustrates example systems that determine correlate media.

FIG. 6A illustrates an embodiment of a media correlation system distributed among the components of FIG. 5. In FIG. 6A, media correlation system 400 includes the following software modules or engines: content (audio/video) capture engine 405, signal capture engine 410, content clip construction engine 415, location engine 420, receipt/transmission engine 425, audio directional filter 430, fingerprint analysis engine 435, motion detection engine 440, and advertisement request engine 445.

The engines 405-445, in an embodiment, are stored in the tablet data base 134, and are executed by the tablet processor 132. The engine 435 and is stored in the server database 77 and are executed by the server processor 72.

The content capture engine 405 operates in conjunction with a microphone and video camera built into the tablet 130 in order to capture segments of media data as that media are displayed on the iTV 110. For example, the engine 405 may capture a five second audio clip every minute. The engine 405 includes an analog-to-digital conversion segment that converts capture analog content into a format that can be processed and analyzed by other components of the software system 400. The engine 405 executes in the background during tablet 130 on-time. Alternately, the engine 405 executes as part of another application (software engine) resident on the tablet 130.

Signal capture engine 410, also resident on the tablet 130, captures a unique signal emitted by the iTV 110, as well as code related to the time/date and channel to which the iTV 110 is tuned. This information then may be used to identify the displayed program based on location of the tablet 130 and known programming for that location.

Clip construction engine 415 creates a digital file related to the captured content. The digital file may simply be a digitized version of the captured analog content, but may also include other data such as a time stamp, and identification of the tablet 130.

Location engine 420 provides information that may be used to geo-locate the tablet 130. For example, in the US, the Internet protocol (IP) address of the tablet 130 provides a generally accurate indication of at least the location of the tablet 130 at the time the IP address was assigned. Assuming the tablet 130 is at that location, the IP address can be used to locate the tablet 130. Alternately, or in addition, the tablet 130 may be located using its GPS location. Many applications executing on a tablet are based on using the tablet's GPS-determined location, and the tablet 130 may be located for purposes of targeting a TV-schedule advertisement based on GPS location.

Receipt/transmission engine 425 is used for two-way communication with other devices in the environment 100, such as the service system 70. Receipt/transmission engine 425 formats outgoing message according to a standard protocol, and reads incoming, formatted messages based on the standard protocol.

Directional filter 430 is used with a directional microphone to filter out random, or non-media device-related audio, or to distinguish between multiple media devices. For example, by noting that an audio clip is consistently provided from a given fixed compass direction, the directional filter may determine that audio recorded from a direction 90 degrees away is not coming from the media device (e.g., not coming from the iTV 110).

Fingerprint analysis engine 435 is used to compare the captured content clip, in its digitized state, to a content database, or to compare, in near real time (e.g., within a few seconds or minutes of real time) the digitized data to a monitored broadcast. The fingerprint analysis engine 445 may be resident in both the database 134 and the database 77.

Motion detection engine 440 detects acceleration of the tablet 130. When the detected acceleration reaches a predetermined level, the motion detection engine 440 provides an indication that the tablet is hand held, as opposed to resting on a stable surface. An indication of being hand held may be used in a decision process to determine if the tablet 130 is being used by an individual at the viewing location 100.

Advertisement request engine 445 is used by the tablet 130 to request an advertisement from the service system 70 or from the database 134 (for locally buffered advertisements).

Although the system 400 is described as implemented, in part, on a tablet, the same system components may be implemented on a smartphone or any other media device capable of executing the processing required to detect and identify the media program. Moreover, some of the system 400 components are optional, such as the motion detection engine 400. Furthermore, some of the components may be installed and may execute on other devices such as other remote servers.

Figure 6B:
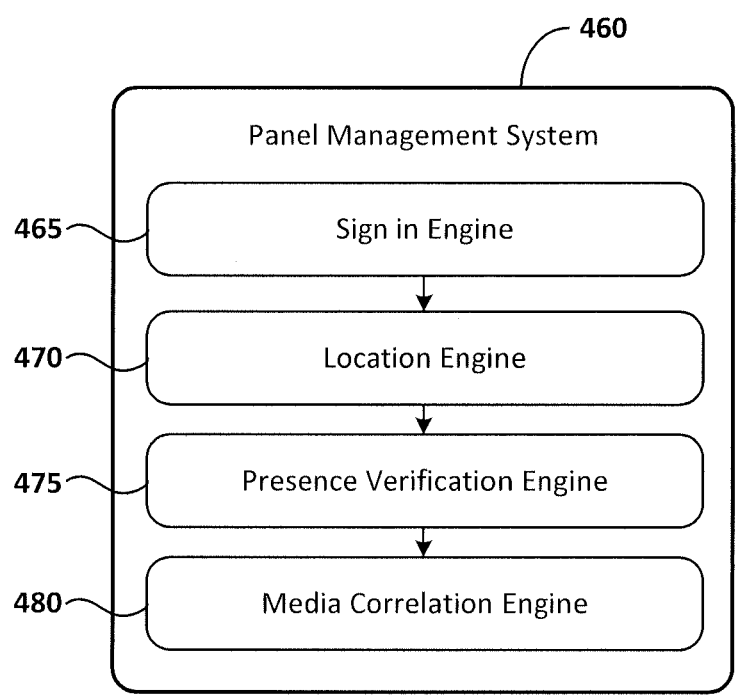

FIG. 6B illustrates panel management system 460, which, as shown in FIG. 4, may be installed on a remote server such as the analytics server 372. In FIG. 6B, system 460 includes sign-in engine 465, location engine 470, presence verification engine 475, and media correlation engine 480.

The sign-in engine 465 detects when a panelist has signed-in with the panelist's smartphone. Alternately, sign-in may be automatic when the smartphone is turned on. The sign on may be used to authenticate the panelist. The location engine 470 receives or determines the geographic location of the smartphone. The location may be received or determined by reference to a geographic signal transmitted by the smartphone, by data from a cellular system, or by requesting a location update from the smartphone.

The presence verification engine 475 verifies the location of the smartphone correlates to a location of the panelist's television or other media device being metered.

The media correlation engine 480 confirms that the panelist's smartphone and television programming are operating in proximity so that programming displayed on the television may be detected and reported by the smartphone. The media correlation engine then executes the media correlation (e.g., audio matching) processes described above with respect to FIG. 6A, if not already performed on the mobile media device.

Figure 7:
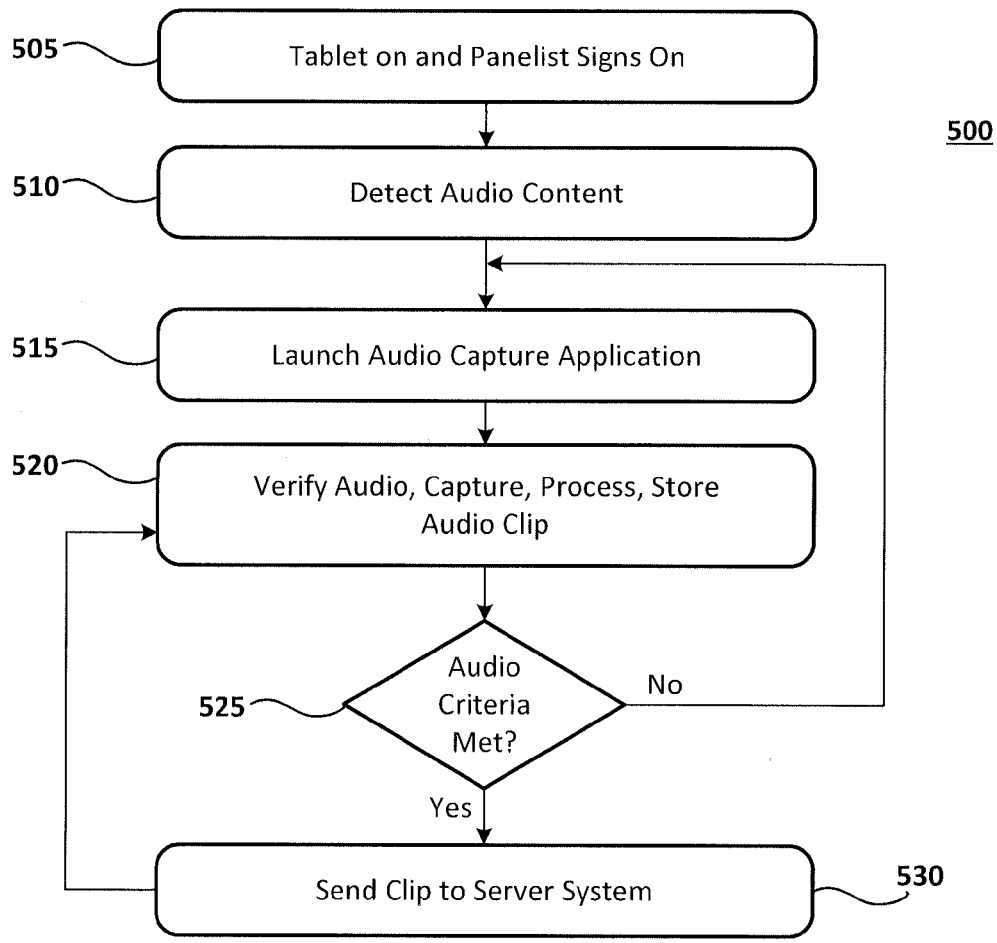
FIGS. 7 and 8 are flowcharts illustrating example media correlation processes as executed by the systems of FIGS. 6A and 6B.

FIG. 7 is a flow chart illustrating an embodiment of an advertisement service method executed in the embodiment of FIG. 2 from the perspective of the tablet 130. In FIG. 7, method 500 begins in block 505 when the tablet 130 is turned on and panelist 22, using the tablet 130, signs on with an Internet service provider. By signing on with the ISP, the panelist's identity may be confirmed, and the panelist 22 may be noted as using the tablet 130. The tablet 130 may include applications that rely on GPS location. The service system 70 then determines the panelist 22 is in the viewing location of the iTV 110, with the tablet 130 in operation and able to monitor audio signals emanating from the iTV 110.

In block 510, the tablet 130 detects audio content and in block 515, launches audio processor engine 405 to ascertain if the audio content is coming from the iTV 110, and to capture, process, and store audio content clips on a periodic basis, for example, the first five seconds of every minute. In block 520, the tablet 130 verifies that it still is detecting audio content from the iTV 110, and captures (records), processes, and stores an audio content clip. In block 525, the tablet 130 determines if the stored audio content clip meets the criteria for transmission to service system 70. Such criteria may include that a sufficient amount of data has been captured during the five seconds. If the criteria are not met, the method 500 returns to block 520 and the tablet 130 continues to capture, process, and store audio content clips. In block 525, if the criteria are met, the method 500 moves to block 530, and the tablet 130 sends the audio clip, and location information related to the tablet 130, to the service system 70. The method 500 then returns to block 520. The method 500 continues as long as the tablet 130 is on and is detecting audio content.

Figure 8:
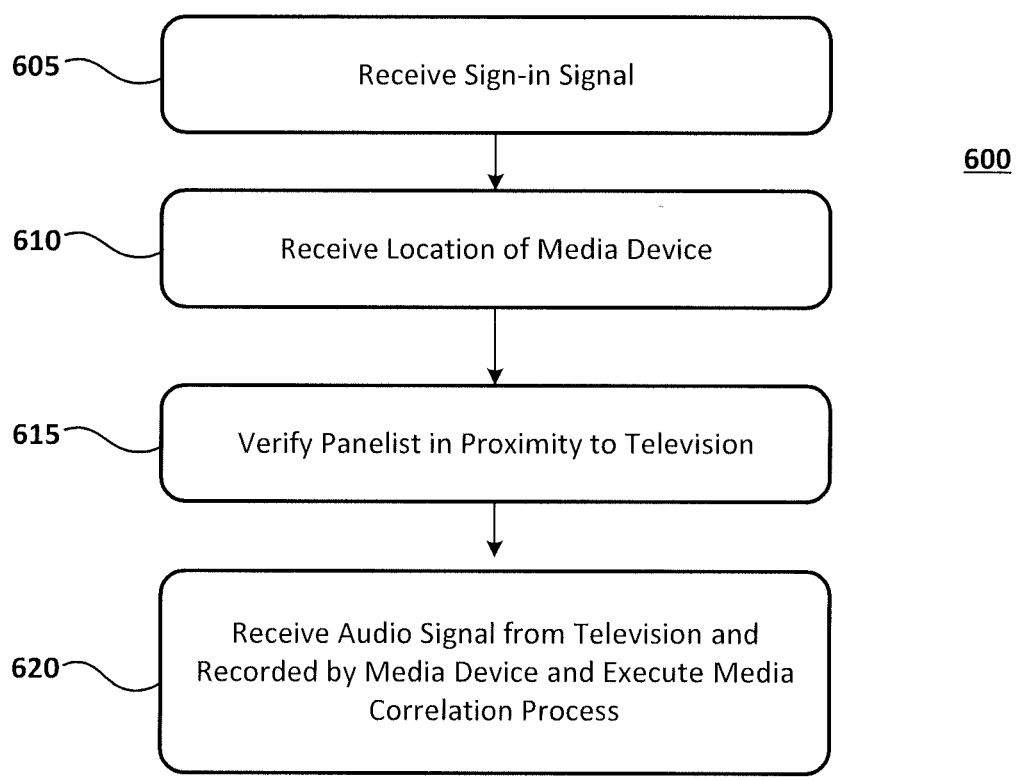

FIG. 8 is a flowchart illustrating a panel management process to detect and identify a media program. In FIG. 8, method 600 begins in block 605 when the server 372 receives a sign-in signal from smartphone 324A, indicating the panelist is watching television and has activated (if required) the smartphone's media correlation program. In block 610, the server 372 receives a geographic location of the smartphone 324A. In block 615, the server 372 verifies the panelist is in proximity to the television such that media correlation is possible. In block 620, the server 372 receives audio signals from the smartphone 324 and executes a media correlation process that identifies the displayed media on the television. The method 600 then ends.

Certain of the devices shown in the herein described figures include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flowcharts and accompanying descriptions to illustrate the embodiments represented in FIGS. 7 and 8. The disclosed devices, components, and systems contemplate using or implementing any suitable technique for performing the steps illustrated. Thus, FIGS. 7 and 8 are for illustration purposes only and the described or similar steps may be performed at any appropriate time, including concurrently, individually, or in combination. In addition, many of the steps in the flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

We claim:

1. A media correlation method for determining an identity of a program, comprising:
    detecting, by a processor of an audience measurement server, a sign-in by a mobile device;
    determining, by the processor, a location of the mobile device relative to a first media device different from the mobile device;
    receiving, by the processor, from the mobile device, content clips emanating from the first media device;
    identifying, by the processor, a program output from the first media device based on the received content clips;

receiving, by the processor, content clips from a second media device in proximity to the mobile device, the second media device different from the mobile device and the first media device;

identifying a program output from the second media device based on the content clips emanating from the second media device;

determining, by the processor while receiving the content clips from the second media device, a second location of the mobile device different from a location of the first media device; and identifying, by the processor, the content clips from the second media device as not received from the first media device, responsive to the determination of the second location of the mobile device.

2. The method of claim 1, wherein identifying the program output from the first media device comprises comparing information contained in the received content clip to a reference source.

3. The method of claim 2, wherein the reference source comprises a database of predetermined reference information.

4. The method of claim 3, wherein the database is stored with the mobile device, wherein the mobile device determines an identity of the program output from the first media device, and wherein identifying the program output from the first media device comprises receiving the determined identification from the mobile device.

5. The method of claim 3, wherein the database is stored in an independent device remote from the mobile device, and wherein identifying the program output from the first media device comprises the independent, remote device determining an identity of the program output from the first media device.

6. The method of claim 2, wherein the reference source comprises a monitored, real-time output of the program at an independent device remote from the mobile device.

7. The method of claim 1, further comprising:
identifying, by the processor, the content clips from the second media device as not received from the first media device, responsive to not receiving content clips from the first media device while receiving the content clips from the second media device.

8. A system for correlating media to determine an identity of a program, comprising:
a processor; and
a computer readable storage medium comprising a program of instructions executable by the processor for media correlation, wherein when the instructions are executed, the processor:
detects a sign-in by a mobile device;
determines a location of the mobile device relative to a first media device different from the mobile device;
receives from the mobile device, content clips emanating from the first media device;
identifies a program output from the first media device based on the received content clips;
receives content clips from a second media device in proximity to the mobile device, the second media device different from the mobile device and the first media device;
identifies a program output from the second media device based on the content clips emanating from the second media device; and
identifies the content clips from the second media device as not received from the first media device, responsive to not receiving content clips from the first media device while receiving the content clips from the second media device.

9. The system of claim 8, wherein identifying the program output from the first media device comprises comparing information contained in the received content clip to a reference source.

10. The system of claim 9, wherein the reference source comprises a database of predetermined reference information.

11. The system of claim 10, wherein the database is stored with the mobile device, wherein the mobile device determines an identity of the program output from the first media device, and wherein identifying the program output from the first media device comprises receiving the determined identification from the mobile device.

12. The system of claim 10, wherein the database is stored in an independent device remote from the mobile device, and wherein identifying the program output from the first media device comprises the independent, remote device determining an identity of the program output from the first media device.

13. The system of claim 10, wherein the reference source comprises a monitored, real-time output of the program at an independent device remote from the mobile device.

14. The system of claim 9, wherein the processor:
receives content clips from the second media device in proximity to the mobile device; and
identifies a program output from the second media device based on the content clips emanating from the second media device.

15. A processor-implemented method for identifying a program output from a first media device by feature extraction using a mobile device, comprising:
determining, by the processor, that the mobile and first media devices are in proximity to each other, the first media device different from the mobile device;
capturing at the mobile device, using the processor, feature information from the program during output of the program on the first media device;
processing the feature information to provide an identification of the program;
subsequently capturing at the mobile device, using the processor, feature information from a second program during output of the second program on a second media device, the second media device different from the first media device and the mobile device; and
identifying, using the processor, the second program as not output from the first media device, responsive to not receiving feature information from the second program from the first media device while capturing the feature information at the mobile device.

16. The method of claim 15, further comprising;
sending the extracted feature information to a remote service; and
executing the feature information processing at the remote service.

17. The method of claim 16, wherein executing the feature information processing comprises comparing the extracted feature information to at least one reference value determined for the program.

* * * * *